United States Patent [19]

Hanson et al.

[11] 4,009,887
[45] Mar. 1, 1977

[54] HYDRAULIC PRESS SEAL

[75] Inventors: Paul D. Hanson; Jack E. Binning; Harry J. Kent, all of Pittsburgh, Pa.

[73] Assignee: Dravo Corporation, Pittsburgh, Pa.

[22] Filed: Dec. 31, 1975

[21] Appl. No.: 645,670

[52] U.S. Cl. .............................. 277/187; 100/269 R
[51] Int. Cl.² ........................ F16J 1/00; B30B 1/32
[58] Field of Search ........................ 100/269–272, 100/249; 92/165 R, 168; 277/187, 189

[56] References Cited

UNITED STATES PATENTS

| | | | |
|---|---|---|---|
| 2,625,413 | 1/1953 | Christensen | 277/187 |
| 2,820,654 | 1/1958 | Bolling | 277/187 |
| 2,908,516 | 10/1959 | Stein | 277/187 |
| 3,300,225 | 1/1967 | Shepler | 277/187 |
| 3,592,131 | 7/1971 | Otsuka | 92/165 R |
| 3,759,146 | 9/1973 | Brotherton | 92/168 |

Primary Examiner—Robert I. Smith
Attorney, Agent, or Firm—Parmelee, Miller, Welsh & Kratz

[57] ABSTRACT

A seal assembly is provided for effecting a fluid seal between the side wall of a vertically movable hydraulic ram and a stationary pressure vessel, the seal assembly comprising a plurality of elongated, resilient, cylindrical members longitudinally disposed along the lip of the pressure vessel confronting the side wall of the ram and including flexible retaining means for said elongated resilient cylindrical members.

5 Claims, 4 Drawing Figures

HYDRAULIC PRESS SEAL

BACKGROUND OF THE INVENTION

In effecting a fluid seal between a large rectangular hydraulic ram vertically movable with respect to a stationary fluid reservoir, a lip-type seal is customarily used. However, lip-type seals have a relatively short service life and usually fail after about 10,000 cycles, thus necessitating replacement. Additionally, these seals are molded in one piece and, due to the size of the ram, approximately 8 × 28 feet, such molded seals are impractical and unwieldy.

It would be desirable to employ an O-ring type seal; however, commercially available seals require that the clearance between the ram and the pressure vessel not exceed a maximum of 0.016 inches at 400 psi, for example, a 65 durometer rubber O-ring. Moreover, in such large hydraulic rams, the gap that must be sealed between the ram and the pressure vessel generally varies from about 0.190 inches to 0.380 inches or greater, which is well beyond the maximum tolerance that can be effectively bridged and sealed by a conventional O-ring seal.

OBJECT OF THE INVENTION

It is, therefore, an object of this invention to provide a fluid seal between the ram and the fluid reservoir of a hydraulic press devoid of the disadvantages of conventional lip-type seals.

It is another object of this invention to provide an O-ring type fluid seal between the ram and fluid reservoir of a hydraulic press that has a service life of up to four times longer than conventional seals.

It is a further object of this invention to provide an O-ring type fluid seal between the ram and fluid reservoir of a hydraulic press that is less time consuming and less expensive to install and replace then conventional seals.

It is yet another object of this invention to provide an O-ring type fluid seal between the ram and fluid reservoir of a hydraulic press that can be field-fabricated from readily available materials.

It is an additional object of this invention to provide an O-ring type fluid seal between the ram and fluid reservoir of a hydraulic press that can be easily adapted for use with existing installations.

It is an additional object of this invention to provide a flexible retaining means for an O-ring type fluid seal which can adjust to horizontal repositioning of the ram whether due to thermal expansion of the press or horizontal forces on the ram while maintaining a maximum gap which can be effectively sealed.

BRIEF DESCRIPTION OF THE INVENTION

Generally speaking, the fluid seal of the invention is designed to prevent fluid leakage between the ram and fluid reservoir of a hydraulic press, the ram being generally vertically movable with respect to the fluid reservoir, the seal comprising a plurality of O-rings longitudinally disposed in a channel formed in the top surface of the fluid reservoir confronting the side of the ram, a strip member having a generally L-shaped cross section disposed parallel to the O-rings and bridging the gap between the ram and the fluid reservoir and a longitudinally disposed cover plate to maintain both the O-rings and the strip member in place.

DETAILED DESCRIPTION OF THE INVENTION

Figure 1:
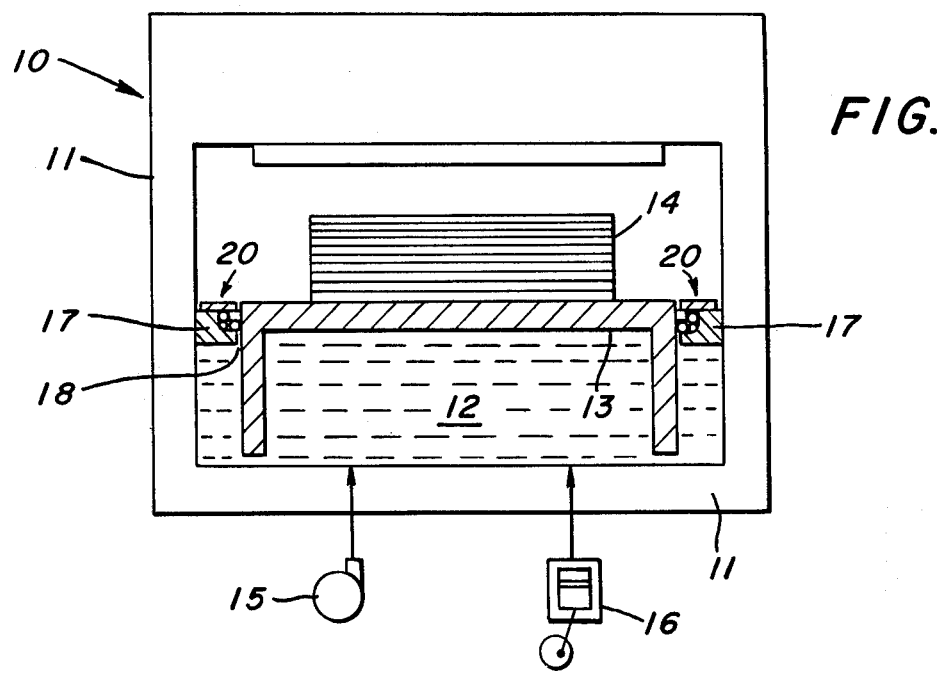
FIG. 1 is a schematic, cross-sectional view of a hydraulic press showing the placement of the fluid seal of the invention.

With reference to the drawings wherein like reference numbers to like elements throughout, a typical hydraulic press is schematically generally depicted at 10 in FIG. 1. The construction and mode of operation of the press 10 are well known to the art and, consequently, will only be discussed in general terms herein. The press 10 comprises a support frame 11, the bottom portion of which serves a fluid reservoir 12, defined by an inwardly projecting side wall 17 and the side wall of ram 13. The ram 13 carrying a workpiece 14 that is to be compressed, such as, for example, in the manufacture of plywood, is vertically displaced by application of pressure exerted on the fluid in reservoir 12.

Figure 2:
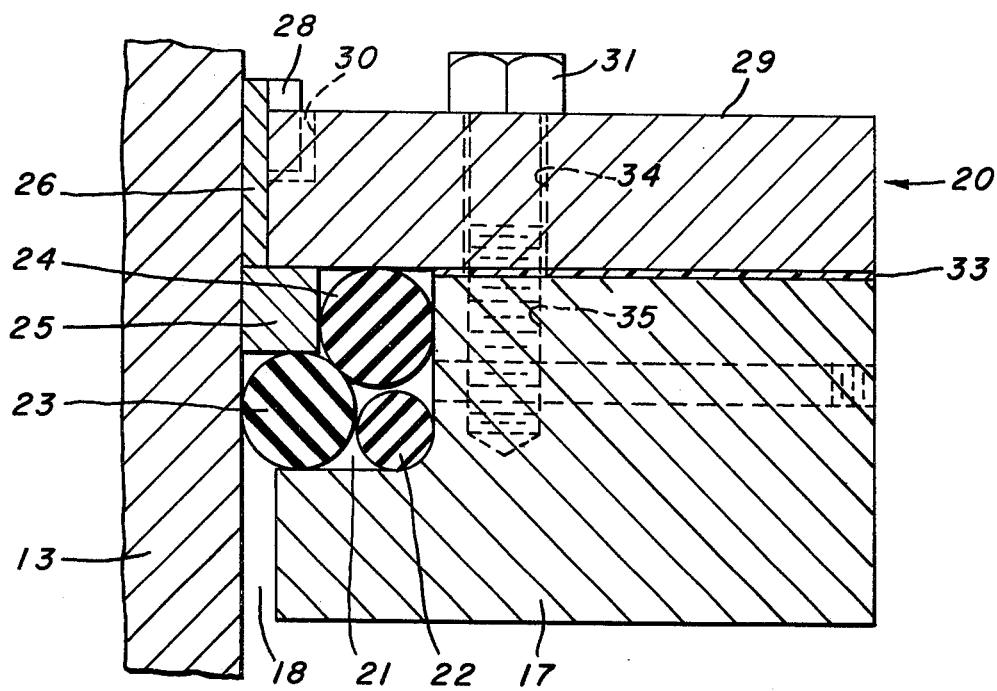
FIG. 2 is an enlarged side sectional view of the fluid seal of the invention.

Typically, a low pressure, e.g., about 5 psi, is first applied by a low-pressure, high-volume pump 15 to begin the press cycle and raise the ram 13, the press cycle being completed at a high pressure, e.g., about 400 psi, by a high-pressure pump 16. In either the low pressure or high stage of the press cycle, there should be no fluid leakage through the peripheral gap 18, between the ram 13 and the side wall 17, as fluid leakage will both impair the efficiency of the ram as well as contaminate the workpiece. The bridge the gap 18 and to assure lead-free operation, a peripheral seal 20 is provided in the top inwardly facing edge of side wall 17 confronting the side wall of ram 13, which seal 20 is shown in detail in FIGS. 2 and 3.

A longitudinally extending channel or recess 21 is formed in the top inwardly directed edge of side wall 17 confronting the side wall of ram 13. A first elongated resilient cylindrical member 22 is longitudinally disposed in the angle of the channel 21; a elongated resilient cyclindrical member 23 is disposed parallel to member 22 along the lip of the channel 21; and a third elongated resilient cylindrical member 24 is disposed atop and parallel to members 22 and 23. The elongated cylindrical members are commonly referred to as O-rings and are made of a relatively hard elastomeric material, such as 65 durometer neoprene rubber or the like. Preferably, O-rings 23 and 24 are of the same diameter, while the diameter of O-ring 22 is somewhat less. In a typical installation, the diameter of O-rings 23 and 24 are about ½ inch and the diameter of O-ring 22 is about ¼ inch.

A back-up strip 25, preferably made of brass, having a generally rectangular cross-section, is disposed parallel to the cylindrical members. As shown in the drawings, the right-hand face of strip 25 bears against cylindrical member 24, the bottom face bears against cylindrical element 23 and the left-hand face confronts and bears against the side wall of ram 13. Upstanding elongated flange members 26 are secured at spaced intervals along the top face of the strip 25. Elongated lug members 28 are provided along the top edge of the flange members 26, the lug members 28 projecting away from the side wall of ram 13. The lug members 28 may be secured to the flange members 26 by welding or the like or may be formed integrally therewith.

Figure 3:
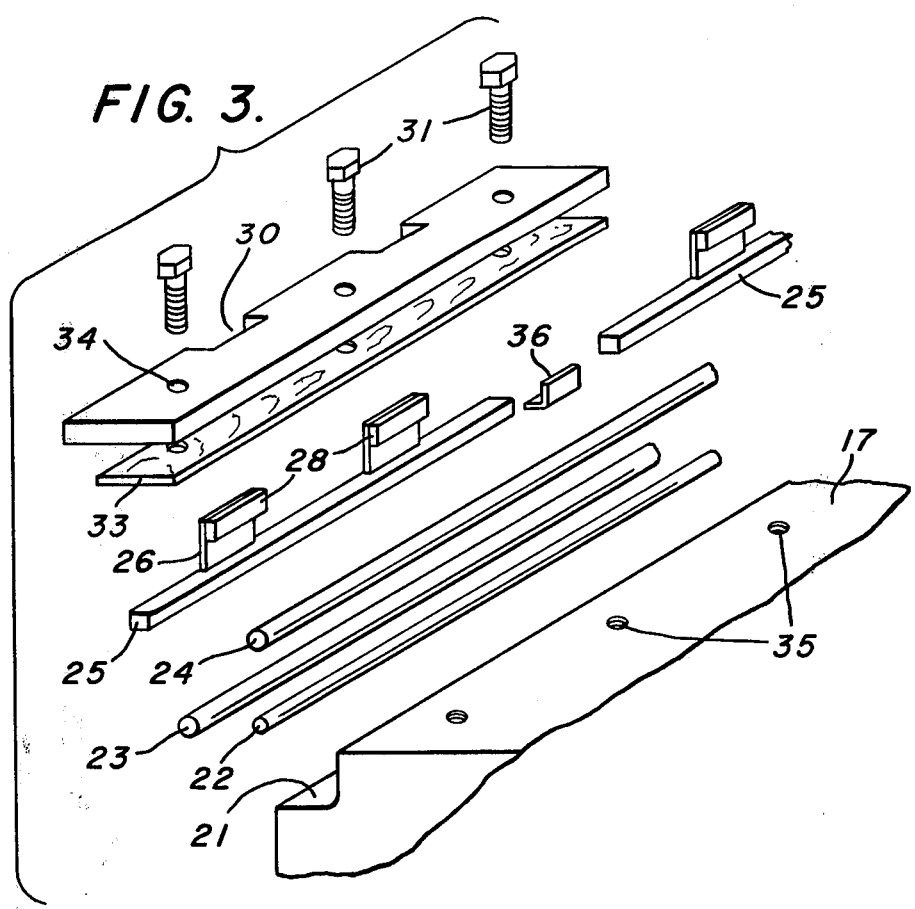
FIG. 3 is an exploded perspective view showing the elements of the fluid seal of the invention.

Strips 25 are fabricated in convenient lengths depending upon the dimensions of the press. The strips 25 are installed in sections with a narrow, i.e., about 1/16 inch, gap between adjacent strips to eliminate high tensile/compressive forces in the strips due to sidewise movement of the ram. The narrow gaps between adjacent strips 25 are bridged by a thin gauge, L-shaped clip member 36, as shown in FIG. 3, to provide a smooth continuous bearing surface for the cylindrical members 23 and 24 and to allow for free longitudinal movement of strips 25 whenever the ram moves in a longitudinal direction. The cylindrical members 22, 23 and 24 and associated strip 25 are maintained in their respective positions by a cover plate 29 which is secured to the top surface of side wall 17 via threaded bolts 31, both cover plate 29 and the top surface of side wall 17 having spaced corresponding threaded taps 34 and 35 bored respectively therein to receive bolts 31. To further assure a leaktight seal, a gasket 33 is disposed between cover plate 29 and the top surface of side wall 17. When cover plate 29 is in position, the front bottom surface thereof bears on the top surface of strips 25, thus preventing vertical movement thereof. To further firmly secure and position element 25, the elongated lugs 28 formed along the top edges of flanges 26 engage corresponding elongated notches or cut-outs 30 formed in the top inwardly directed surface of cover plate 29.

A leak-free fluid seal is effected by the cooperation of the above-described elements in the following manner. The back-up strip bridges the relatively large gap (i.e., about 0.190 to 0.380 inches) which cannot effectively be sealed by O-rings, thus reducing the size of the gap to a dimension that can be effectively sealed by O-rings (i.e., maximum of about 0.016 inches). In addition, the back-up strip serves as a bearing surface for the vertically displaceable ram and also maintains the O-rings in position. The seal is effected by contact between cover plate 29 and O-ring 24, contact between O-ring 24 and O-ring 23, and by contact between O-ring 23 and the side wall of ram 13. O-ring 22 is provided to insure low pressure seal capacity of the installation. Due to manufacturing tolerances and wear of parts, at low pressures, for example, from 5 to 10 psig, O-rings 23 and 24 may not provide an effective seal. For this reason, a tap 32 is provided in side wall 17 to deliver a high pressure fluid at about 100 psig, from a high pressure fluid source (not shown). Thus, upon the application of a high pressure fluid via tap 32 to the seal assembly, in addition to the previously described seals effected by O-rings 23 and 24, a further seal is also provided by O-ring 22 between O-ring 23 and the lower surface of channel 21.

Figure 4:
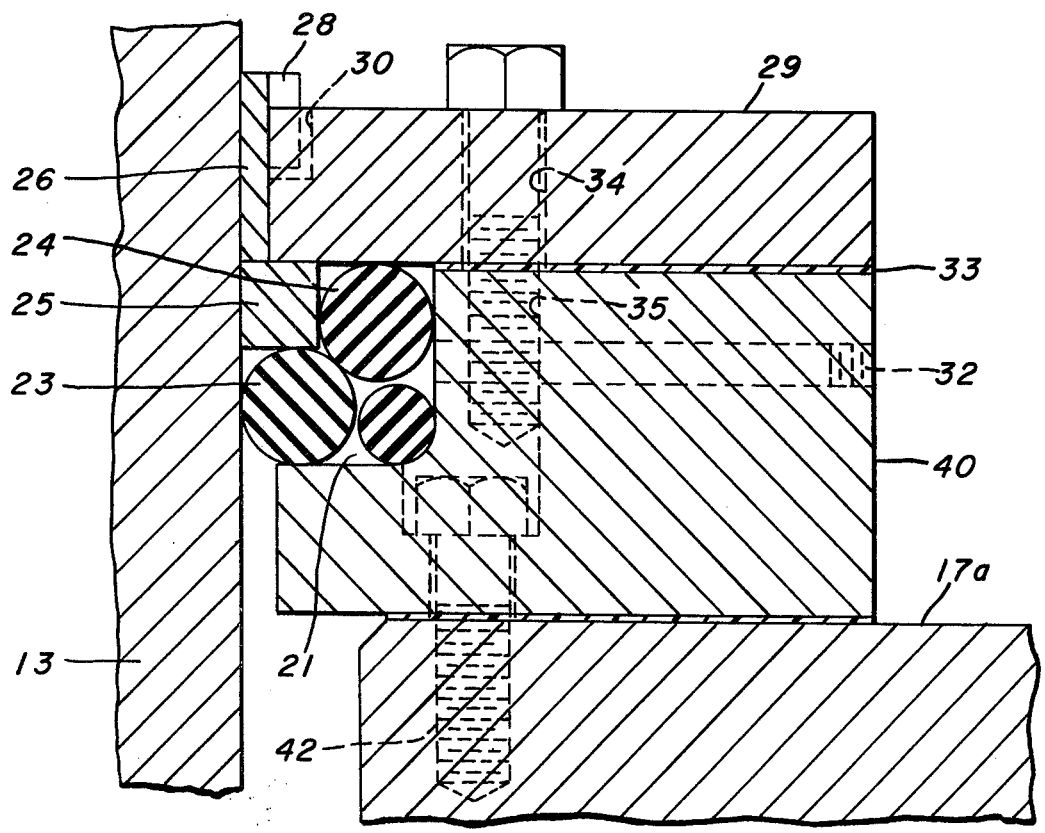
FIG. 4 is a view similar to FIG. 2 showing the means by which the fluid seal of the invention may be adapted to an existing installation.

As previously mentioned, the seal assembly can be adapted for use with existing presses as shown, for example, in FIG. 4. In an existing installation, rather than machine a recess in side wall 17a, a gland base 40 is secured to side wall 17a by threaded bolts 42 as illustrated or the gland base 40 may be welded to side wall 17a. With the exception of the gland base adapter, the remaining elements of the seal assembly are identical with those described hereinabove.

What is claimed is:

1. A seal assembly for sealing the peripheral gap between a vertically movable ram and a stationary fluid reservoir of a hydraulic press to prevent fluid leakage therebetween, said seal assembly comprising:
    a. a first elongated, resilient, cylindrical member longitudinally disposed in a longitudinally extending, generally semi-circular channel formed in the top edge of the fluid reservoir and confronting the side wall of the ram;
    b. a second elongated, resilient, cylindrical member disposed parallel to and in abutting relationship with the first cylindrical member;
    c. a third elongated, resilient, cylindrical member disposed parallel to, overlying and in abutting relationship with the first and second cylidrical members;
    d. a plurality of adjacent elongated metal strips, with a narrow gap between adjacent strips, each of said strips being rectangular in transverse section and disposed parallel to said cylindrical members, one vertical face of said strip bearing against the third cylindrical member, the other vertical face bearing against the side wall of the ram and the bottom face bearing against the second cylidrical member; and
    e. an elongated cover plate secured to the top surface of side wall, one edge of the cover plate overhanging edge bearing both against the top surface of the elongated metal strip and the third cylindrical member.

2. The seal assembly of claim 1 including a plurality of spaced, elongated flange members secured to the upper surface of the elongated metal strip, the flange members being parallel to the bearing against the side wall of the ram, the upper ends of each of said flange members being provided with an elongated lug member engaging a corresponding slot formed in the upper overhanging edge of the cover plate.

3. The seal assembly of claim 1 further including means for injecting a high pressure fluid source into said channel.

4. The seal assembly of claim 1 wherein the second and third cylindrical members have the same cross-sectional diameter and the first cylindrical member has a cross-sectional diameter of about one-half that of the other cylindrical members.

5. The seal assembly of claim 1 including a thin gauge clip member, L-shaped when viewed in transverse section, to bridge the gap between the adjacent elongated metal strips to provide a smooth, continuous bearing surface for the cylindrical members and to permit free longitudinal movement of the elongated metal strips.

* * * * *